United States Patent [19]
Bialkowski et al.

[11] Patent Number: 5,574,910
[45] Date of Patent: * Nov. 12, 1996

[54] METHOD FOR SEGMENTING DATA PACKETS TO FORM BINARY DECISION TREES WHICH DETERMINE FILTER MASKS COMBINED TO FILTER THE PACKETS FOR FORWARDING

[75] Inventors: Jan Bialkowski, Nashua, N.H.; John Krawczyk, Watertown, Mass.

[73] Assignee: Bay Networks, Inc., Santa Clara, Calif.

[ * ] Notice: The term of this patent shall not extend beyond the expiration date of Pat. No. 5,463,777.

[21] Appl. No.: 550,525

[22] Filed: Oct. 30, 1995

Related U.S. Application Data

[63] Continuation of Ser. No. 396,374, Feb. 28, 1995, Pat. No. 5,463,777, which is a continuation of Ser. No. 908,248, Jul. 2, 1992, abandoned.

[51] Int. Cl.⁶ ........................................ G06F 17/30
[52] U.S. Cl. ........................................ 395/601; 364/DIG. 1
[58] Field of Search ............................. 395/600

[56] References Cited

U.S. PATENT DOCUMENTS

| | | | |
|---|---|---|---|
| 4,456,957 | 6/1984 | Schieltz | 395/200 |
| 4,593,282 | 6/1986 | Acampora et al. | 340/825.5 |
| 4,813,038 | 3/1989 | Lee | 370/60 |
| 4,924,426 | 5/1990 | Kameoa et al. | 395/425 |
| 4,987,539 | 1/1991 | Moore et al. | 364/413.08 |
| 5,130,983 | 7/1992 | Heffner, III | 370/85.8 |
| 5,249,292 | 9/1993 | Chiappa | 395/650 |
| 5,271,000 | 12/1993 | Engbersen et al. | 370/13 |
| 5,276,899 | 1/1994 | Neches | 395/800 |
| 5,327,127 | 7/1994 | May et al. | 341/102 |
| 5,463,777 | 10/1995 | Bialkowski et al. | 395/600 |

OTHER PUBLICATIONS

Sedgewick, Algorithms, Addison–Wesley, 1983, Table of Contents, pp. 127–140; pp. 171–185; pp. 187–200; pp. 225–231.

*Primary Examiner*—Wayne Amsbury
*Attorney, Agent, or Firm*—Fish & Richardson P.C.

[57] ABSTRACT

A packet processing method and apparatus efficiently process a binary data packet based upon information contained in the header portion of the packet. The method and apparatus employ a binary tree search method for determining ranges of key elements of the packet and associating with each of the ranges a user supplied data and filter mask. The binary search process employs a unique binary tree storage structure which both conserves storage memory and enables efficient processing to reach a final node of the binary tree decision table. Nodes can be added or deleted from the table by the user as the data packet processing needs change.

2 Claims, 8 Drawing Sheets

FIG. 5 DELETE RIGHT BRANCH

FIG. 6 RIGHT INSERT

METHOD FOR SEGMENTING DATA PACKETS TO FORM BINARY DECISION TREES WHICH DETERMINE FILTER MASKS COMBINED TO FILTER THE PACKETS FOR FORWARDING

This is a continuation of application Ser. No. 08/396,374, filed Feb. 28, 1995, now U.S. Pat. No. 5463777; which is a continuation of application Ser. No. 07/908,248, filed Jul. 2, 1992 now abandoned.

The invention relates generally to the transmission, processing, and forwarding of data communications packets, and in particular, to the method and apparatus for processing the packets at an intermediate node during transmission from source to destination.

BACKGROUND OF THE INVENTION

The process of transmitting data packets from a source to a destination typically requires at least one intermediate forwarding node. The equipment at the intermediate node, often called a router or a bridge, receives the data packet, examines or analyzes it, and forwards it on to a next node or destination on the network as is appropriate. The process of examining the packet typically employs table look-ups, and the process of demultiplexing the packet, and analyzing, filtering and forwarding the packet headers, requires a substantial amount of table look-up. Their frequency, and the overall computer processor time expended for those tasks, requires substantial processor capability. Accordingly, methods have been employed to reduce the CPU requirements, and, accordingly, improve throughput through the node and maintain effective costs.

It is therefore an object of this invention to provide a yet further improved throughput through a router or bridge, and simultaneously reduce the need for CPU processor time while maintaining memory requirements and other hardware needs at a minimum. Other objects of the invention include high reliability, the capability of handling complex packet headers, and effectively providing filtering results simultaneously with the destination address determination.

SUMMARY OF THE INVENTION

The invention relates to a method and apparatus for processing binary data packets which have an information containing portion and a data containing portion. The method features the steps of creating and storing at least one binary tree decision table which has a plurality of non-final nodes and a plurality of final nodes. The table represents a binary decision tree structure. The method further features the steps of processing the information containing portion of the data packet to be processed using the binary tree table for determining the processing to be used for the packet, and thereafter processing the packet in accordance with the processing results just obtained.

The apparatus and method of the invention are particularly advantageous in using the binary tree search for determining whether a particular key value is contained in a predefined range of data values previously input by the user. If a key included in the information containing portion of the packet falls within a predefined range, the search algorithm provides user data and filter mask data for use by the packet processing system. The use of the user supplied data does not require a priori knowledge of where in the range the key value is positioned and the binary tree search method similarly does not attempt to provide an exact match to the key value (except in the special instance where the range contains only one value). Accordingly, as is well known in the art, many key values to be searched in a data packet header need only be associated with a contiguous range of data and the described binary tree search method and apparatus uniquely provides in an efficient manner the "imprecise" match of the key value to the range and thereafter associates with that key value the designated user data and filter mask information previously provided to the system.

In particular embodiments of the invention, the creating and storing step features the steps of dividing a storage table or memory into a numbered sequence of subarrays, ordering the binary tree structure in a dependency order of numbered tree nodes, and storing left and right node children of a node numbered "n", and stored at subarray "n", at subarrays "2n" and "2n+1" corresponding to nodes "2n" and "2n+1", respectively. In order to achieve better and more balanced processing, the method further features the steps of assigning a weight to each node which is equal to sum of the weights of each of its child nodes "+1", and thereafter balancing the binary tree structure whenever the weights associated with two child nodes of a common parent node differ by more than one.

The packet processing method further features the ability to add and delete nodes from an existing binary tree structure by modifying the binary tree decision table. The method further features, in a particular embodiment of the invention, processing the incoming information containing portion of a packet by deciding, for each non-final node, whether a selected subset of the portion is greater than a predetermined node threshold value and thereafter proceeding to one of the lower order right child node or left child node depending on the relative values of the subset and the threshold. The non-final subarrays thereby store threshold values, and each final subarray is reached by passing through a sequence of non-final nodes. The final node contains an information data portion and a filter mask containing portion. The described binary tree structure is particularly advantageous for searching for a range of values.

There will be times when the input information containing portion of the packet to be processed can be advantageously segmented into a plurality of information subset segments, thereby enabling the segments to be processed separately. Accordingly, the invention further features segmenting the input information containing portion into a plurality of information subset segments, processing the segments to determine a filter mask for each segment, and AND'ing the results of each filter mask with an initial filter mask to determine the final filter processing for the data packet. In those instances where a segment has a length greater than the operating word length associated with the process, the invention features dividing each segment (or the entire information containing portion) into a plurality of subsegments, processing each subsegment through the binary tree structure as noted above, and AND'ing the filter mask results for the subsegments to achieve a final filter mask instruction.

The apparatus of the invention, implements the method described above, and typically features circuitry for creating and storing at least one binary tree decision table having a plurality of non-final nodes and a plurality of final nodes. As before, the table represents a binary decision tree structure. The apparatus further features circuitry for processing the information containing portion of the data packet, segmenting it if necessary, using the binary tree table for determining the processing to be used for the packet. The packet is then processed in accordance with those processing results.

Where necessary, circuitry is further provided for efficiently storing the binary tree table, balancing the table as necessary, adding and deleting nodes, passing through the binary tree in an ordered fashion using the threshold values stored in, in association with each node, the memory subarray, and segmenting the information containing portions either due to length of the portion or the separation of related information, into subsegments of the information containing portion, which subsegments are then serially processed.

BRIEF DESCRIPTION OF THE DRAWINGS

Other objects, features and advantages of the invention will be apparent from the following description taken together with the drawings in which.

DESCRIPTION OF THE PREFERRED EMBODIMENT

Figure 1:
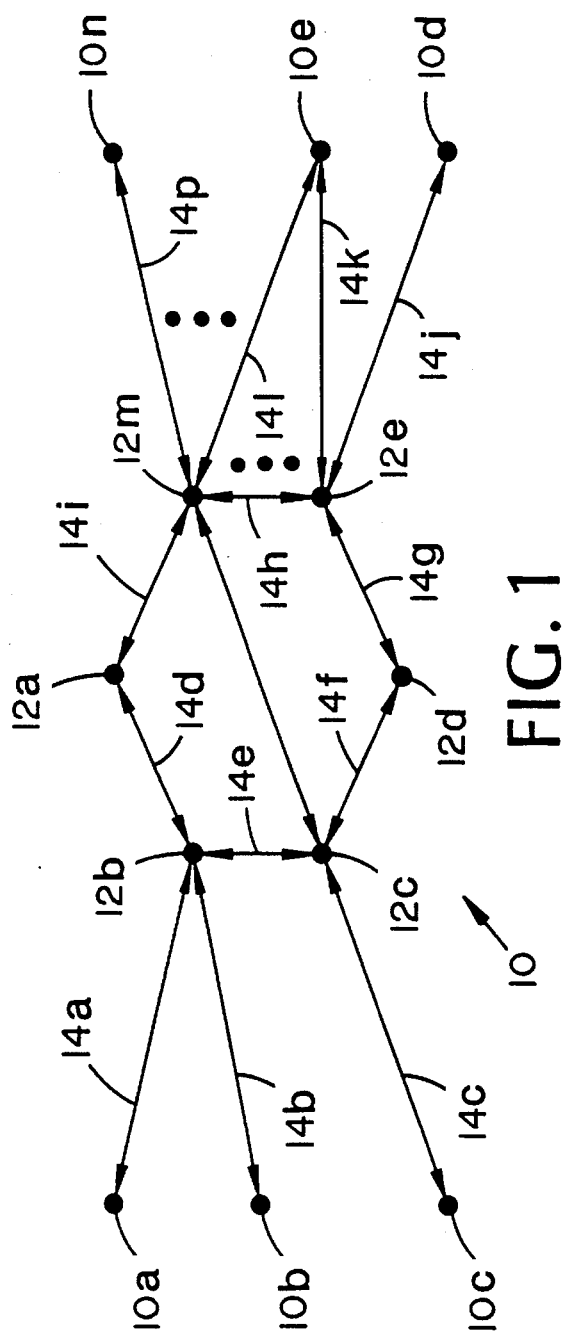
FIG. 1 is an illustrative network including source/destination and analyzing/forwarding nodes of a typical network.

Referring to FIG. 1, a data communications network 10 can have a plurality of source, or destination, nodes 10a, 10b, . . . , 10n and a plurality of intermediate connecting or forwarding nodes 12a, 12b, . . . , 12m. The various nodes, whether they are source/destination nodes, or intermediate/forwarding nodes, are interconnected in various circuit patterns by interconnecting data links 14a, 14b, . . . , 14p. In this data transmission environment, therefore, a data packet sent, for example, from a (source) node 10a to a (destination) node 10d, can traverse a plurality of different paths 14, depending upon, for example, the availability of the paths, the cost of the various paths, the speed of the various paths, the operability of the paths, etc.

Figure 2:
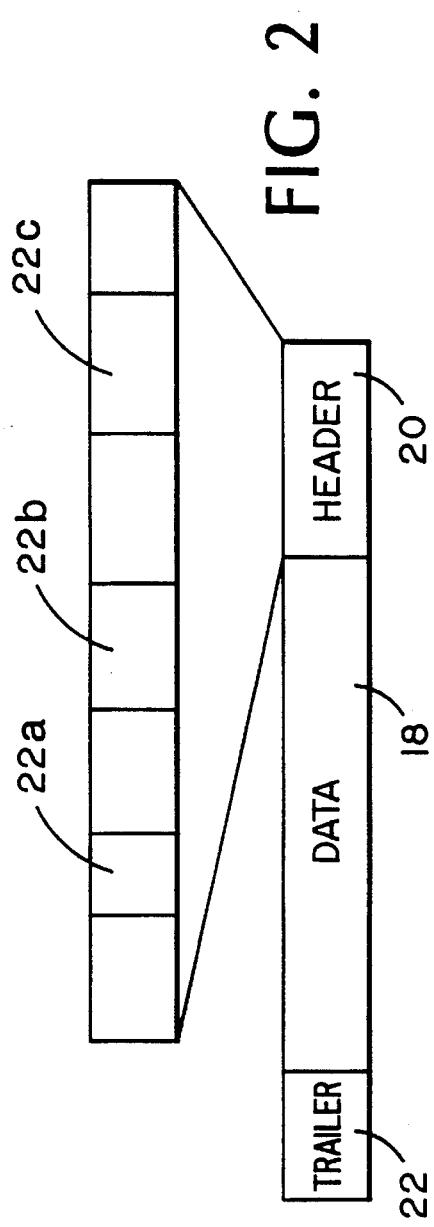
FIG. 2 illustrates the structure of a typical data packet to be analyzed and operated upon in accordance with the invention.

In accordance with the preferred embodiment of the invention, the data sent from a source node to a destination node, is transmitted in the form of a data packet 16. Referring to FIG. 2, a typical data packet 16 is transmitted by appending to the data portion 18 of the packet, a header portion 20, and adding at the end of the data packet, a trailer portion 22. The header portion can contain any of a number of different items of information, which, according to the protocol being employed, will appear in known positional locations within the header. The header information may include, for example, the address of the destination node, the address of the source node, a preferred path to take, instructions with regard to timing of the data and forwarding the data in accordance with various filtering operations. The trailer portion of the data packet may include, for example, a CRC check to insure accuracy and integrity of the data packet once it is received.

In accordance with a preferred embodiment of the invention, the header portion of the data packet is decoded so that the intermediate or forwarding node 12 has sufficient information to forward (or not forward) and otherwise process the data packet in an appropriate manner over the appropriate paths. For example, an intermediate or forwarding node 12b has the option of passing a data packet over path 14d or 14e when, for example, the destination is node 10d. The header information being provided can simplify that choice or provide a command which eliminates the ability of the node to "choose".

In accordance with the illustrated embodiment of the invention, the header information can be quite long, for example, over several hundred bits of data. Accordingly, the decoding process for the header can be either long or tedious, or both, and can take substantial CPU time, which otherwise could be used for more "profitable" functions. In any case, the passage of the packet through the intermediate node can be accordingly delayed. In accordance with the present invention, a binary tree structure is employed to speed the data packet through the intermediate node 12 to its eventual destination. The binary tree structure operates, in a simple manner, to process and analyze the incoming data packet, filter it, and thereby, if appropriate, pass it on to a next node.

In accordance with the invention, therefore, a specialized and highly optimized table look-up service is provided for demultiplexing, forwarding, and filtering the data packet. The look-up table method implements, preferably in a software embodiment, an associative memory that stores the data identified by various "keys", such as the destination and source addresses, so that during a look-up operation, the information can be scanned until a match of the key being processed is obtained. While a linear search could be implemented, it is far too slow to be of practical use. In particular, since the keys which are to be supported can be of arbitrary length (but typically are contiguous), the linear search does not provide a practical solution. In addition, it is typical that a key has a range of values, each of which causes the same filtering operation(s) to take place.

Accordingly, in accordance with the preferred embodiment of the invention, a unique binary tree table is employed to effect the look-up service. In accordance with the illustrated preferred embodiment, key fields within the packets are defined using bit offsets from a convenient reference point, for example, the beginning of the packet. The header keys can have variable formats, for example, IP options, and additional reference points may be needed. The bit offsets are stored in the table where they can be referenced during the table search. The look-up table binary tree is a uniquely adapted to searching for ranges of data, and to apply user supplied information to the entire range. In this manner, a key incorporating, for example, IP options, can be advantageously and quickly decoded and a range of values will provide a common, user-identified, result.

The look-up table can directly deal with at most only 32-bit contiguous keys in accordance with the illustrated embodiment of the invention. Smaller, that is, shorter length keys, are always preferably left adjusted and larger, but contiguous keys are transparently divided or chopped into 32 bit fragments by system interface software routines. Non-contiguous keys, which are useful for performing arbitrary filtering, require a more intimate involvement with the application, that is, the look-up table must be segmented so that the first look-up stage processes one 32 bit key fragment or subfragment, and thereby results in a reference to a second stage look-up table, and so on. The final look-up result returns the user data supplied when the entry was installed in the table.

The left shifting of the shorter key lengths is equivalent to providing a range of values defined by the most significant bits of the left shifted key, with the lower order bits, the bits shifted into a 32 bit word, being in effect "don't care" bits. The described binary tree search is particularly adapted to searching for a range of values set up by the left shifted key in accordance with the invention.

There is, however, one problem with this approach. The second, third, and further levels of table will occupy exponentially growing space within the memory. Thus, for example, if a first level table has 1,000 entries pointing to 1,000 second level tables, each with 1,000 entries, it becomes clear that the process will not adequately work because the second and subsequent set of tables must be shared among many, and preferably all, entries in preceding level tables. The table sharing, however, loses information about earlier look-up results in the process. For example, if all first level entries pointed to the same second level table, the first level look-up entry would have only a one bit result: either the entry was found, in which case it would go to the second table or not, in which case the packet would be dropped. This is insufficient to implement any rational filter.

Figure 3:
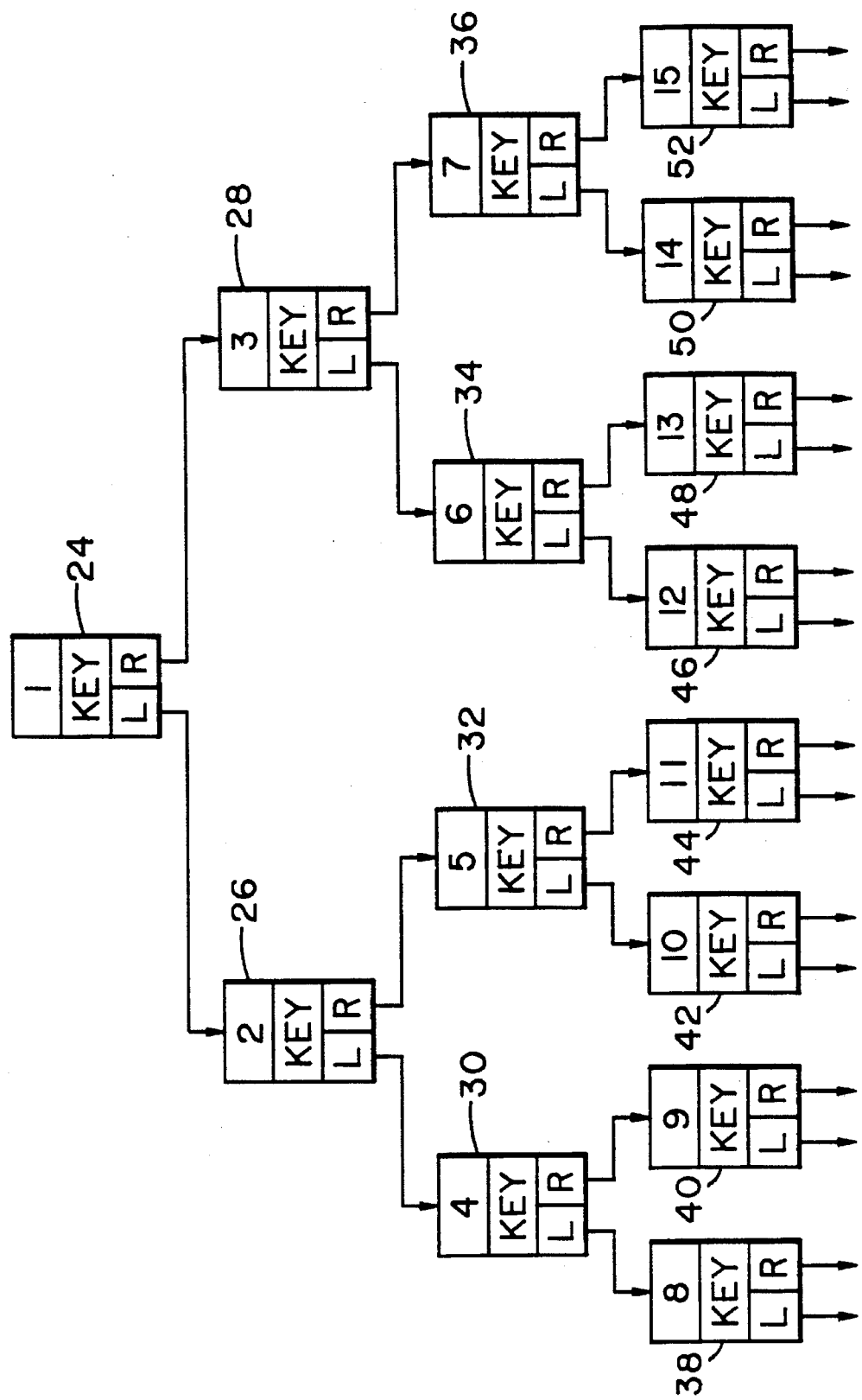
FIG. 3 illustrates a decision tree structure in accordance with a preferred embodiment of the invention.

Thus, for a header made up of a plurality of key values 22a, 22b, 22c, which may correspond, for example, to source address, destination address, and protocol type, the system must decide how the packets will be processed. In accordance with a preferred embodiment of the invention, a binary tree table approach is employed, in which the decision process is reduced to "simple binary decisions" based upon the various keys 22 in the packet. A typical look-up binary tree structure is illustrated in FIG. 3, in which, starting from a root node 24, the tree structure emmanates. The binary tree structure provides that for each parent node, such as root node 24, there exists a left child node such as node 26 and a right child node, such as node 28. This procedure continues for the entire tree, so that, for the illustrated embodiment, further left and right child nodes are provided and labelled 30, 32, . . . , 52. In accordance with this embodiment, for each key of the header, the system makes binary decisions for determining, at the various nodes, whether a particular range of values, or a specific value (a range limited to one value) exists. The process thus provides for passing through various non-final nodes in the tree to a final node at which a selected range or value is determined to exist. Beyond this final node, there are no further nodes and the final node provides both a filter mask instruction word, as well as user data. The filter mask instruction word, in fact a filter mask, is a specification word, each bit of which is associated with a different operation. Thus, one bit may provide for dropping the packet and not passing it forward, while another bit will provide for a different action. The apparatus can thus, once the final node has been determined, take the filter mask and perform operations upon the packet data in accordance with the bits set therein.

The resulting "look-up table" thus provides for a method for determining whether a range of values, or a specific value (a range limited to one value) has been found and, when found, the filtering operation to be applied to that range of values. Accordingly, each non-final node thus represents, itself, a range of values, the left child node of which represents a lower portion of the range and the right child node represents the upper portion of the range. At the end of the search process, the user data and filter mask of the final node are thus applicable to all values in the range represented by the final node.

If the operation upon the packet is determined by a plurality of keys, rather than one key of the header, there can result a sequence of tree searches with a resulting sequence of filter mask values for determining operations upon the data packet. In this instance, each of the various masks can be advantageously and, in the preferred embodiment are, "AND'ed" together, so that only bits set for each and every filter mask will survive and be effective. In a properly constructed binary tree structure, the operations will not be self-contradicting.

The length of the filter mask is arbitrarily set at 32 bits, each of the bits being used for filtering in the illustrated embodiment. In fact, in other embodiments of the invention, the length of the mask is arbitrary, and one or more bits could be set aside, for example the 32nd bit of the mask could be reserved for normal forwarding.

In a preferred embodiment of the invention, and to avoid using excessive memory, the binary tree table can be stored as a "look up table" as follows. First, as illustrated in FIG. 3, the nodes are numbered, in sequence, so that the root node is numbered "1", its children are numbered "2" and "3" for the left hand and right hand child, respectively, and each successive node in the tree, node n, is numbered so that its children are numbered 2n and 2n+1 for the left and right child nodes, respectively. In this manner, referring to FIG. 4, a unique and compact structure is provided for storing the binary tree look-up table. In its most general form, each of the "numbered" nodes, is represented with and associated with, a subarray of memory corresponding to its number in the sequence. In a particular embodiment of the invention, each subarray associated with a non-final node need only contain a threshold value, so that if the value of the key is greater than or equal to the threshold value, then the right child node is selected; otherwise, the left child node is selected. In this manner, a unique and simple memory structure is achieved to store the binary tree nodes.

Figure 7:
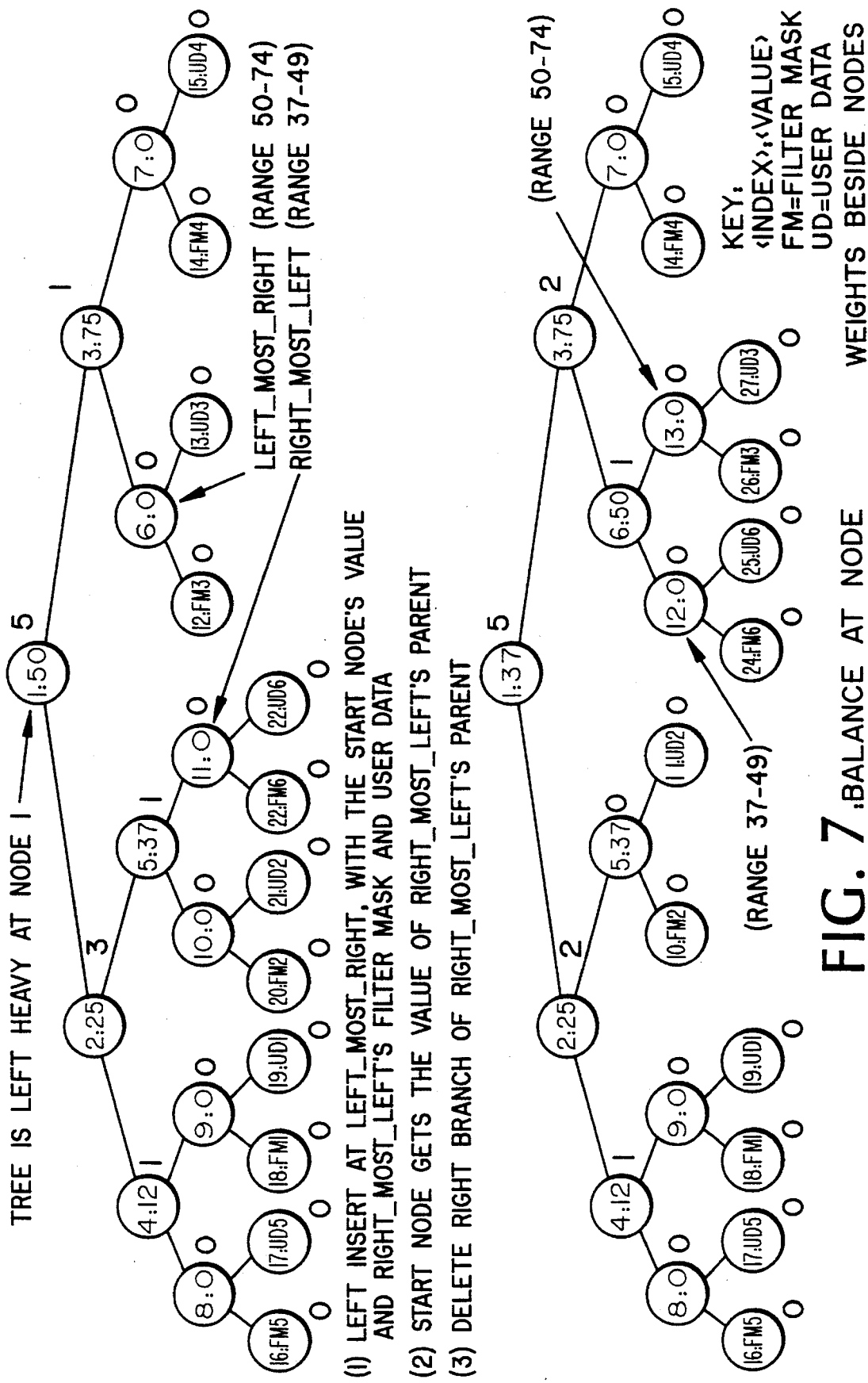
FIG. 7 illustrates the balancing of a binary decision tree in accordance with a preferred embodiment of the invention.

In a preferred embodiment of the invention, in order to achieve efficient operation, the tree is balanced wherein each final node of the tree is given a "weight" of "0" and each non-final node of the tree is given a weight equal to the sum of the weights of its right and left hand children, plus 1. Under these circumstances, if the weights of the children of any node differ by more than 1, the tree can be restructured so that the children of any node will no longer have a difference in the weight greater than 1. Such a rebalancing is illustrated in FIGS. 7A and 7B. Such balancing of the binary tree provides a particularly efficient table search function for any particular value of the key being examined. This efficiency results by a minimization of a number of overall average number of steps needed to search the value of the key, assuming the values have a uniform probability density distribution.

In accordance with a preferred embodiment of the invention, when the header portion is composed of a plurality of different keys, all of which can affect the filtering, if any, to be performed upon the data packet, the header keys can be separately selected, thus segmenting the header, and each of the keys can be processed through a separate binary tree structure to determine the filter mask appropriate to that key to be applied to the data packet. The resulting filter masks are AND'ed together to provide an overall filtering capability for processing that data packet. In addition, in accordance with the preferred embodiment of the invention, the resulting filter value is also AND'ed with a predetermined limited number of filter options, designated by a 32 bit preset filter word, which limits the number of filter operations which the user has designated as applying to that binary tree decoding process.

In addition, since the keys themselves, in this illustrated embodiment of the invention, are limited to a 32 bit value, the invention provides for segmenting, or subsegmenting any key or segmented portion of the header so that the various portions of the header are handled separately in 32 bit "chunks". For any portion of a header less than 32 bits in length, in accordance with a particular preferred embodiment of the invention, the remaining portion of the key is left shifted to the most significant portion of the 32 bit word representing the key subsegment. The results of each of the segmentation analyses in accordance with the invention are thereby AND'ed together to provide the resulting filter solution for analyzing and enabling processing of the packet.

Figure 4:
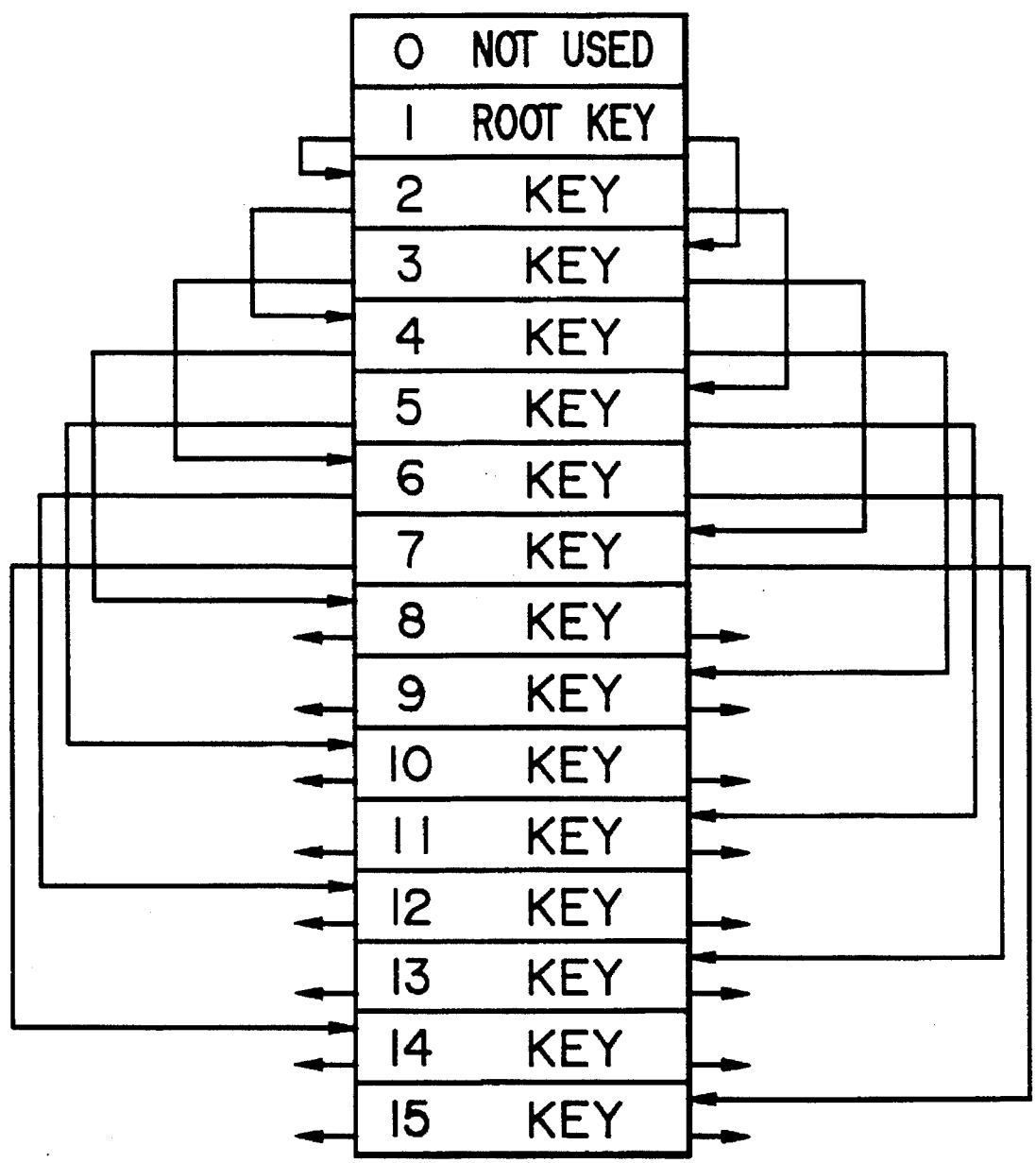
FIG. 4 illustrates a memory structure accordance for storing and implementing the binary tree structure of FIG. 3 in accordance with a preferred embodiment of the invention.
Figure 5:
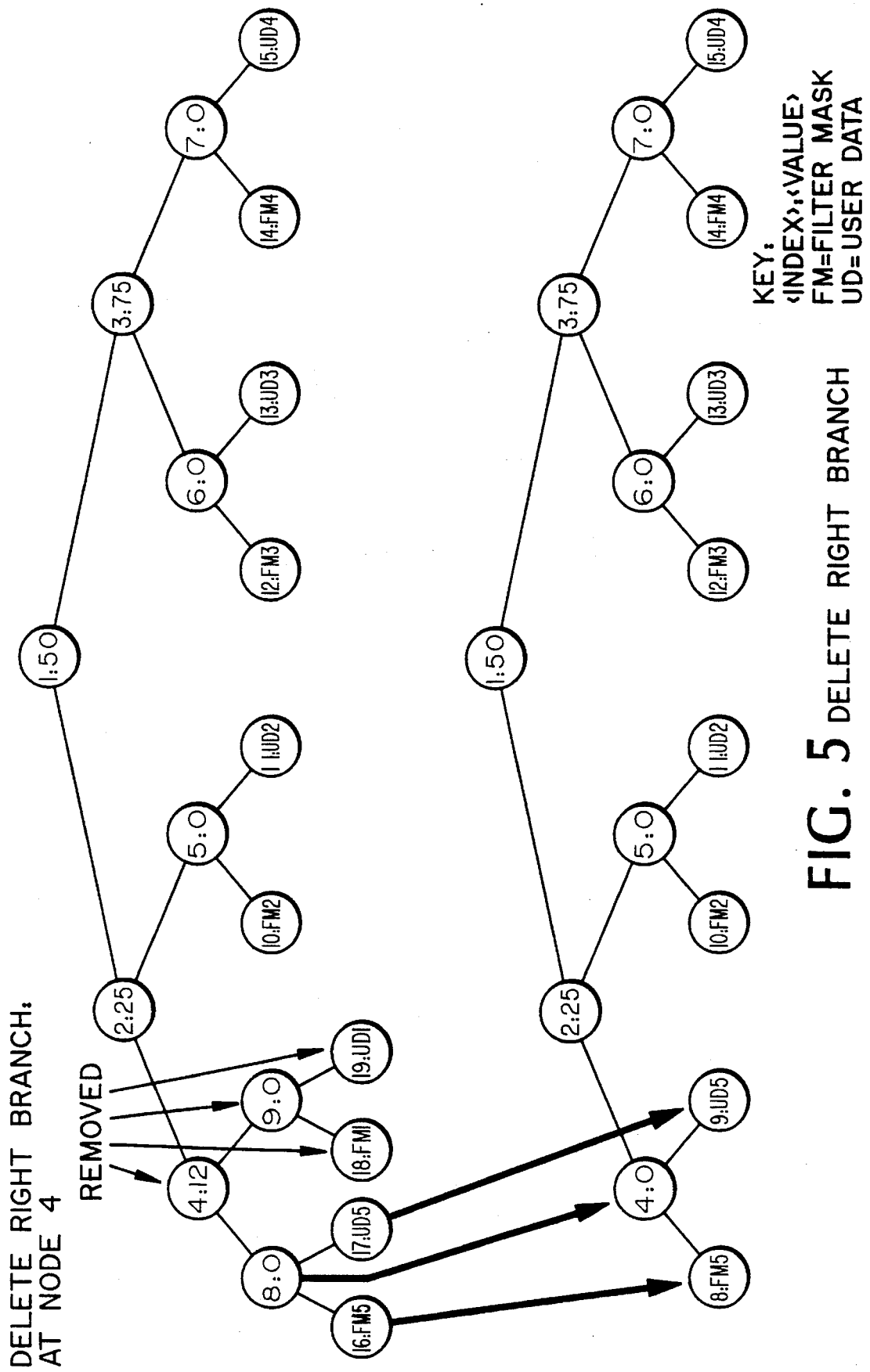
FIG. 5 illustrates the deletion of a node from a binary tree structure.

Further, in accordance with a preferred embodiment of the invention, there is a provided a method for adding or deleting nodes from the tree structure of FIG. 3, and thereby reconfigure the memory configuration of FIG. 4. In accordance with this aspect of the apparatus, referring to FIG. 5, there are deleted nodes numbered 4, 9, 18 and 19. In accordance with the process of node deletion, the nondeleted child nodes of each deleted parent replace the parent in this structure and each of the child nodes of the now new "parent" are renumbered in accordance with the invention. Thus, in FIG. 5, node 4 and its left hand children are deleted. In FIG. 5, the nomenclature used within the node defining circle is "node number: threshold value".

Figure 6:
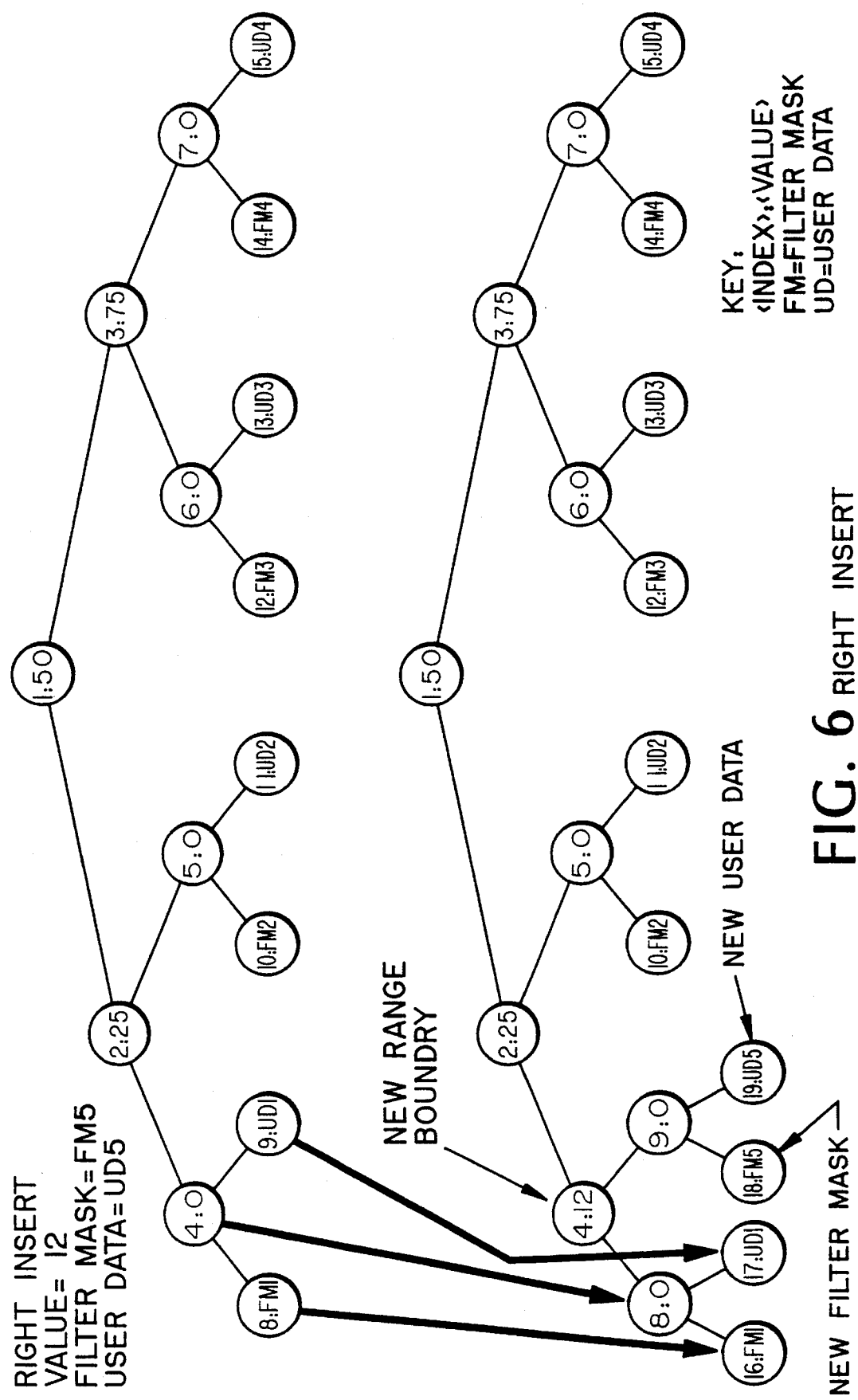
FIG. 6 illustrates the insertion of a node in a decision tree structure.

The addition of a node is illustrated in FIG. 6, in which a new node has been inserted, at node 4, due to the change in threshold value at node 4. In this example, therefore, previously "final" nodes 8 and 9 provide new threshold decision values.

The insertion of nodes typically results in the splitting of ranges (that is the addition of a new range boundary), whereas the deletion of nodes typically represents the combining of two or more existing ranges and hence then elimination of one (or more) range boundaries (that is, the merger of smaller ranges). The particular examples of FIGS. 5 and 6 also illustrate the use of a special threshold values, "0" in the examples, to denote a final node.

Referring to FIGS. 7A and 7B, there is illustrated a typical balancing rearrangement, in which, in FIG. 7A, the tree is "too heavy" on the left branch of node 1 and, accordingly, is "rebalanced" in FIG. 7B by moving some of the "weight" from the left hand side of the tree to the right hand side of the tree. Note that the two trees of FIGS. 7A and 7B are equivalent to each other, but that the weight associated with the child nodes is now "balanced".

Each final node of the tree also provides user data which can be employed as required for effecting user instructed operations. Typically, this will depend, at least in part, upon the filtering to be performed by the system.

Figure 8:
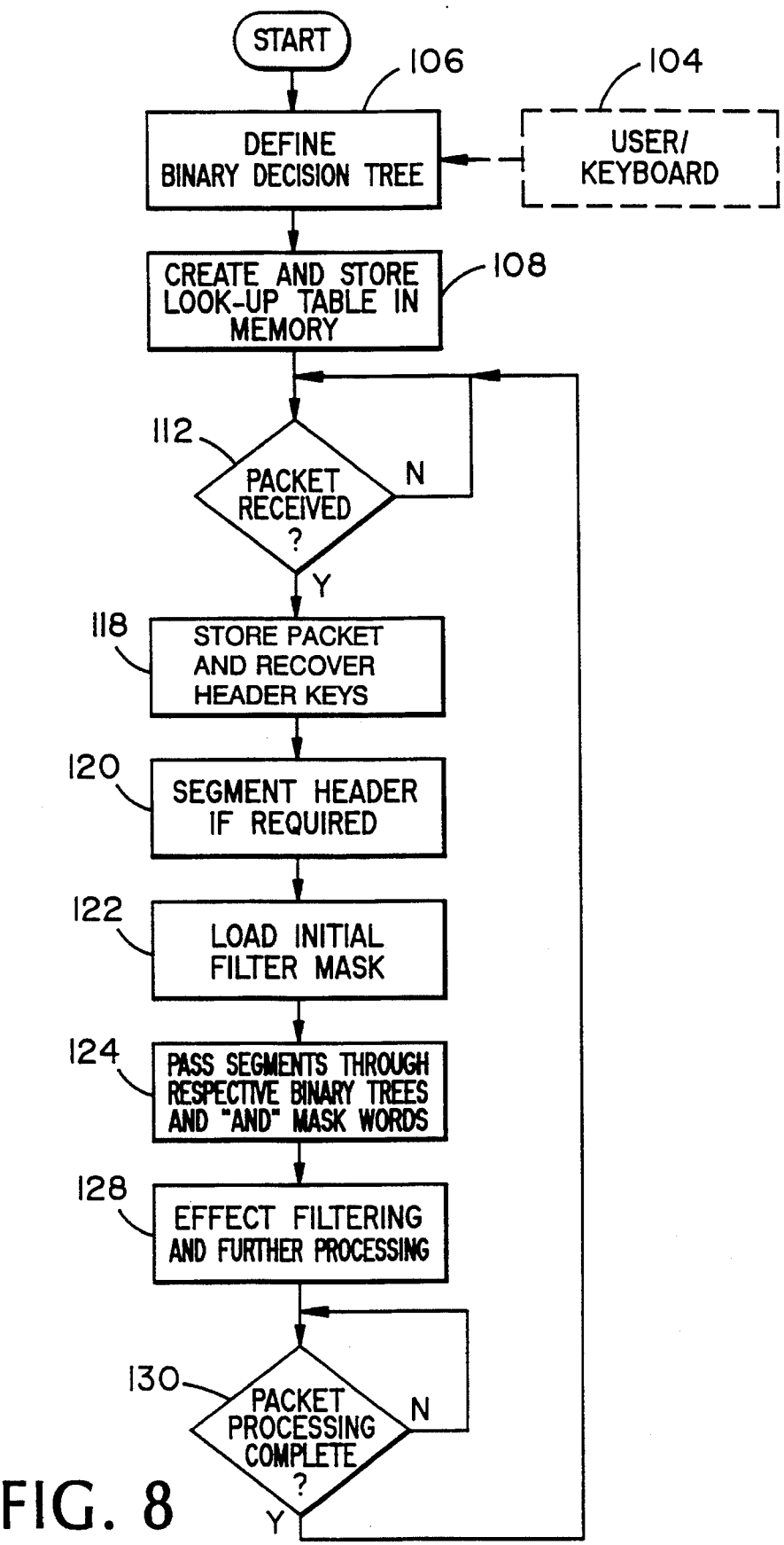
FIG. 8 is a flow chart illustrating operation of the analysis and filtering system in accordance with the preferred embodiment of the invention.
Figure 9:
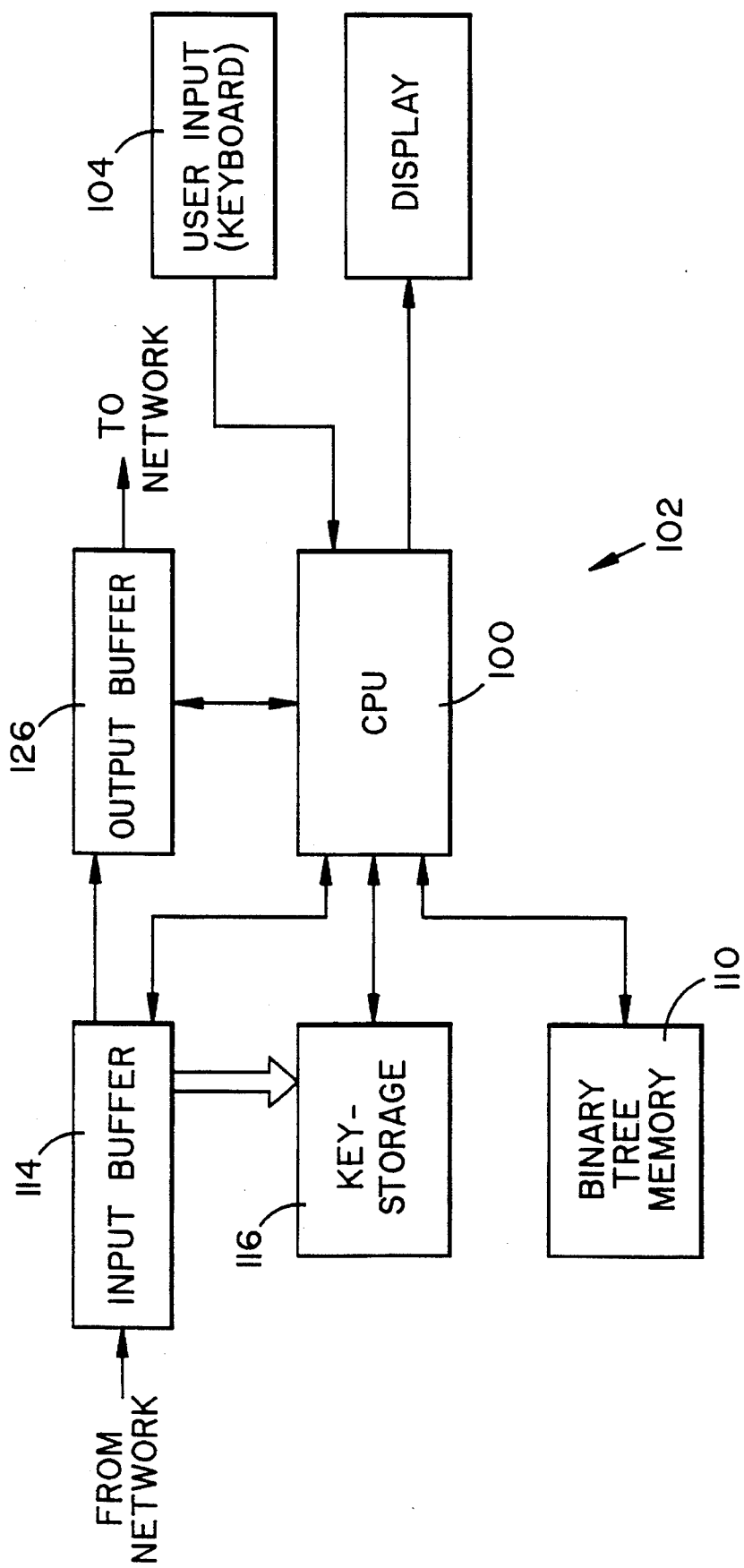
FIG. 9 is a hardware configuration capable of implementing the preferred embodiment of the invention.

Referring to FIG. 8, there is illustrated an overall flow chart illustrating total operation of the system of FIG. 9, in accordance with the illustrated embodiment of the invention.

Referring to FIGS. 8 and 9, the implementation of the invention is preferably performed in accordance with a hardware/software embodiment. As will be apparent to those skilled in the art, the various elements of the invention can be embodied solely in hardware, solely in software or firmware, or in a combination of the two, as is desired for the particular application and the related throughput and costs associated therewith.

In accordance with the illustrated embodiment, a central processing unit 100 controls operation of the packet forwarding apparatus 102 and initially receives user input data, typically from a keyboard input device 104 (although other input devices can be employed) to define the binary decision tree as indicated at 106 of the operational flow chart (FIG. 8). Once the binary decision tree (such as that of FIG. 3) has been defined, the CPU begins operation and creates and stores a look-up table (corresponding to FIG. 4) in memory, which will be used to process incoming packets. This is indicated at 108. The decision tree table is stored in a memory 110, which can be, and preferably is, RAM.

The system is then ready to receive, analyze and process, and forward incoming data packets. The system waits, at 112, for a packet to be received. The received packet is available in an input buffer 114, operating semi-autonomously under the control of the central processing unit 100. Under the control of the CPU, in this illustrated embodiment of the invention, the various keys available in the header, the locations of which are known beforehand by the CPU, are extracted and provided to a key storage memory 116. Packet storage and recovery of the header keys is indicated at 118 in FIG. 8.

The CPU examines the keys, determines typically a priori, whether the keys need to be segmented for proper processing, and, if they do, segmentation is effected at 120. The CPU thereafter recalls an initial filter mask for this packet, which defines and limits the number of operations which can be performed on the packet (indicated at 122) and thereafter passes the segments, serially, through their respective binary trees, and obtains from each binary tree table both a filter mask word and user data. The various filter mask words (32 bit words as noted in this illustrated embodiment of the invention), are AND'ed together with the initial filter mask, at 124, to achieve an overall processing for this data packet. The CPU thereafter processes the data packet in the input buffer in accordance with the filter mask data and creates, in an output buffer 126, the output data packet, which will then be sent over the selected data communications path to a next node on the network. This is indicated at 128. When the processing is complete, as indicated at 130, a next packet can be received and processed.

In this manner, a highly effective throughput and processing of input data packets can be achieved in accordance with the invention, by using the simple concept of binary tree searching with the particular memory saving features and data packet processing concepts embodied in the method and apparatus of the invention.

In other embodiments of the invention, a different word length can be used without adversely affecting operation in accordance with the invention. Further, the word length need not correspond exactly to the operating width of either the filter mask, user data, keys or other aspects of the invention.

Additions, subtractions, and other modifications of the described embodiments of the invention will be apparent to those of ordinary skill in the field and are within the scope of the following claims.

What is claimed is:

1. A method for processing a data communications binary data packet including a data portion and an information containing portion having keys, each key having at least one data value, the method comprising the steps of:

segmenting said information containing portion into a plurality of information subset segments, each segment associated with at least one of said keys, creating and storing at least one look-up table associated with said keys, said at least one table having a plurality of non-final nodes, and a plurality of final nodes, processing each said information subset segments using the tables to determine a filter mask for each key, combining the results of each filter mask to provide a final filter mask for determining data processing to be used for said packet on the basis of data values of the keys being within preselected ranges of data values, and processing said packet in accordance with the processing results using said final filter mask.

2. The packet processing method of claim 1 wherein said table creating and storing step comprises the steps of providing an n-ary tree decision table.

* * * * *